UNITED STATES PATENT OFFICE.

HANS KÜHL, OF BLANKENESE, NEAR HAMBURG, GERMANY, ASSIGNOR, BY MESNE ASSIGNMENTS, TO THE ATLAS PORTLAND CEMENT COMPANY, OF NEW YORK, N. Y., A CORPORATION OF PENNSYLVANIA.

SLAG CEMENT AND PROCESS OF MAKING THE SAME.

No. 900,939.

Specification of Letters Patent.　　Patented Oct. 13, 1908.

Application filed July 3, 1907. Serial No. 381,960.

*To all whom it may concern:*

Be it known that I, HANS KÜHL, a subject of the King of Prussia, and resident of Blankenese, near Hamburg, German Empire, have invented certain new and useful Improvements in Slag Cement and Processes of Making the Same, of which the following is an exact specification.

This invention relates to slag cement and relates especially to cement composed substantially of basic blast furnace slag with which substantially non-hygroscopic additions are employed so as to be capable of producing free caustic alkali in connection with the slag material when the cement is moistened with water in the customary manner of utilization.

Basic blast furnace slag containing about 45% or so of lime may be converted into a substantially vitreous or inert slag material by water granulation and drying or by the well known air granulating or disintegrating processes, such as those using air or steam jets. This vitreous inert slag material usually hardens only very slowly and imperfectly at ordinary temperatures and gives only a slight rise of temperature when ground, moistened and treated with carbon-dioxid. This vitreous basic slag or slag material comprising the same may, however, be very finely ground and suitable substantially non-hygroscopic accelerating and developing material incorporated therewith which when the cement is moistened with water for use produces free caustic alkali in connection with the slag material by chemical reaction. Such added materials should preferably comprise suitable accelerating material containing some caustic alkali salt material, such as sodium sulfate or sodium carbonate, or suitable mixtures of the same to the extent of one or two per cent. of the slag. The developing material should be some suitable basic material such for example, as oxids or hydrates of the alkaline earths which is capable of reacting with the other ingredients of the cement when moistened at ordinary temperatures so as to develop free caustic alkali, preferably containing potassium or sodium hydrate. For example, calcium hydrate to the extent of two or three per cent. of the ground slag material may be used as the developing material.

Sulfates of the caustic alkalies are especially desirable for the accelerating material because in case lime is used as the developing material the reaction occurring when the cement is moistened for use produces calcium sulfate which is desirable as a regulating agent and for other purposes. By properly selecting the proportion of sulfates in the accelerating material used the desired regulation of the setting and the strength of the cement at various times can be secured. It is, of course, apparent that where the accelerating and developing materials added to the slag are substantially non-hygroscopic, that is, where they are not objectionably water-absorbing or hygroscopic under commercial conditions the cement will have good keeping qualities. Even after being stored for many months slag cement of this character has proved to be fully equal to the best Portland cements in its constancy of volume, setting properties and strength both when the test pieces are kept in air and in water.

Having described this invention in connection with a number of illustrative ingredients and proportions, to the details of which disclosure this invention is not, of course, to be limited, what is claimed as new and what is desired to be secured by Letters Patent is set forth in the appended claims.

1. The cement comprising vitreous basic blast furnace slag with which not more than a few per cent. of accelerating material, including sodium sulfate and sodium carbonate and not more than a few per cent. of developing material including calcium hydrate have been incorporated so as to be capable of producing free caustic alkali in connection with the slag material when the cement is moistened for use.

2. The cement comprising vitreous basic blast furnace slag with which not more than a few per cent. of accelerating material including sodium sulfate and sodium carbonate and not more than a few per cent. of developing material including free basic material have been incorporated so as to be capable of producing free caustic alkali in connection with the slag material when the cement is moistened for use.

3. The cement comprising vitreous blast furnace slag with which not more than a few per cent. of accelerating material including a sulfate of a caustic alkali and not more than a few per cent. of developing material including free basic material have been incorporated so as to be capable of producing free caustic alkali in connection with the slag material when the cement is moistened for use.

4. The cement comprising vitreous slag material with which not more than a few per cent. of substantially non-hygroscopic accelerating material including caustic alkali salt material and not more than a few per cent. of developing material have been incorporated so as to be capable of producing free caustic alkali in connection with the slag material when the cement is moistened for use.

5. The cement comprising vitreous slag material with which not more than a few per cent. of substantially non-hygroscopic material including caustic alkali material has been incorporated so as to be capable of producing free caustic alkali in connection with the slag material when the cement is moistened for use to accelerate and intensify the setting properties of the cement.

6. The cement comprising silicate material with which not more than a few per cent. of substantially non-hygroscopic added material has been incorporated so as to be capable of producing free caustic alkali material in connection with said silicate material when the cement is moistened for use to accelerate and intensify the setting properties of the cement.

7. The cement comprising vitreous basic blast furnace slag with which not more than a few per cent. of substantially non-hygroscopic material comprising caustic alkali material has been added so as to secure the presence of free alkali material in connection with the slag when the cement is moistened for use to accelerate and intensify the setting properties of the cement.

8. The cement process which consists in adding to vitreous basic blast furnace slag not more than a few per cent. of substantially non-hygroscopic material comprising caustic alkali material so as to secure the presence of free caustic alkali in connection with the slag material when the cement is moistened for use to accelerate and intensify the setting properties of the cement.

9. The cement process which consists in incorporating with vitreous basic blast furnace slag not more than a few per cent. of substantially non-hygroscopic material so as to produce free alkali in connection with the slag material when the cement is moistened for use.

10. The cement process which consists in incorporating with vitreous basic blast furnace slag not more than a few per cent. of substantially non-hygroscopic material so as to produce free caustic alkali in connection with the slag by chemical reaction when the cement is moistened for use.

11. The cement process which consists in incorporating with basic blast furnace slag material not more than a few per cent. of accelerating material including a sulfate of a caustic alkali and not more than a few per cent. of free basic developing material so as to produce free caustic alkali in connection with the slag material when the cement is moistened for use.

12. The cement process which consists in incorporating with basic blast furnace slag material not more than a few per cent. of accelerating material including sodium sulfate and not more than a few per cent. of basic developing material so as to produce free caustic alkali in connection with said slag material when the cement is moistened for use.

13. The cement process which consists in incorporating with blast furnace slag material not more than a few per cent. of accelerating material including sodium sulfate and sodium carbonate and not more than a few per cent. of developing material including calcium hydrate so as to produce free caustic alkali in connection with said slag material when the cement is moistened for use.

In witness whereof I have hereunto set my hand in the presence of two witnesses.

HANS KÜHL.

Witnesses:
ERNEST H. L. MUMMENHOFF,
OTTO W. HELLMRICH.